(12) United States Patent
Steeman et al.

(10) Patent No.: US 9,428,599 B2
(45) Date of Patent: Aug. 30, 2016

(54) MULTISTAGE DRAWING PROCESS FOR DRAWING POLYMERIC ELONGATED OBJECTS

(75) Inventors: Reinard Jozef Maria Steeman, Echt (NL); Joseph Arnold Paul Maria Simmelink, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 138 days.

(21) Appl. No.: 13/983,793

(22) PCT Filed: Feb. 17, 2012

(86) PCT No.: PCT/EP2012/052775
§ 371 (c)(1),
(2), (4) Date: Oct. 15, 2013

(87) PCT Pub. No.: WO2012/113727
PCT Pub. Date: Aug. 30, 2012

(65) Prior Publication Data
US 2015/0038663 A1    Feb. 5, 2015

(30) Foreign Application Priority Data

Feb. 24, 2011  (EP) .................................. 11155820

(51) Int. Cl.
| | | |
|---|---|---|
| *D01D 5/16* | (2006.01) |
| *D02J 1/22* | (2006.01) |
| *C08F 110/02* | (2006.01) |
| *D01D 5/12* | (2006.01) |
| *D01F 6/04* | (2006.01) |
| *B29C 55/06* | (2006.01) |
| *B29D 7/01* | (2006.01) |
| *B29D 99/00* | (2010.01) |
| *B29K 23/00* | (2006.01) |

(52) U.S. Cl.
CPC ........... *C08F 110/02* (2013.01); *B29C 55/065* (2013.01); *B29D 7/01* (2013.01); *B29D 99/0078* (2013.01); *D01D 5/12* (2013.01); *D01F 6/04* (2013.01); *D02J 1/228* (2013.01); *B29K 2023/0675* (2013.01); *B29K 2023/0683* (2013.01)

(58) Field of Classification Search
CPC ............. D01D 5/12; D01D 5/16; D02J 1/22; D02J 1/228
USPC .................. 264/210.7, 210.8, 290.5, 290.7; 526/348.1
See application file for complete search history.

(56) References Cited

U.S. PATENT DOCUMENTS

| | | | |
|---|---|---|---|
| 3,649,611 A * | 3/1972 | Okamura et al. ...... 264/210.7 X |
| 3,751,547 A * | 8/1973 | Kawakami et al. ... 264/210.7 X |
| 4,384,016 A | 5/1983 | Ide et al. |
| 4,643,865 A * | 2/1987 | Okada .................... B29C 55/18 264/204 |
| 4,948,544 A * | 8/1990 | Van Unen et al. .... 264/210.7 X |
| 4,968,471 A * | 11/1990 | Ito et al. ................. 264/210.7 X |
| 5,023,035 A * | 6/1991 | Yang ....................... 264/210.7 X |
| 6,241,937 B1 * | 6/2001 | Nakamura et al. .... 264/210.7 X |
| 7,273,578 B1 * | 9/2007 | Slutsker .................. D02J 1/225 264/290.5 X |
| 2006/0210749 A1 | 9/2006 | Geva et al. |

FOREIGN PATENT DOCUMENTS

| | | |
|---|---|---|
| WO | WO 2005/066401 | 7/2005 |
| WO | WO 2008/024732 | 2/2008 |

OTHER PUBLICATIONS

Advanced Fiber Spinning Technology, edited by T. Nakajima (1992) English edition edited by K. Kajiwara and J.E. McIntyre (1994), *Woodhead Publishing Limited*, 21 pages.
International Search Report for PCT/EP2012/052775, mailed May 9, 2012.
EP Appln. No. 12704420.4, Third Party Communication Pursuant to Rule 114(2) EPC (Feb. 27, 2015).

* cited by examiner

*Primary Examiner* — Leo B Tentoni
(74) *Attorney, Agent, or Firm* — Nixon & Vanderhye P.C.

(57) ABSTRACT

The invention relates to a multistage drawing process for the drawing of polymeric elongated objects, containing a first drawing stage and a final drawing stage and optionally containing at least one intermediate drawing stage subsequent to the first drawing stage and prior to the final drawing stage, comprising in the following order the steps of: a. providing a polymeric elongated feed object; b. drawing the elongated object in the first drawing stage with a draw ratio of between 30% and 90% of the maximum drawing ratio achievable in the first drawing step; c. optionally drawing the elongated object in the at least one intermediate drawing stage with a draw ratio of between 30% and 90% of the maximum drawing ratio achievable in the at least one intermediate drawing step; d. drawing the elongated object in the final drawing stage with a draw ratio of at most 5, preferably of at most 3.

14 Claims, 2 Drawing Sheets

MULTISTAGE DRAWING PROCESS FOR DRAWING POLYMERIC ELONGATED OBJECTS

This application is the U.S. national phase of International Application No. PCT/EP2012/052775 filed 17 Feb. 2012 which designated the U.S. and claims priority to EP Patent Application No. 11155820.1 filed 24 Feb. 2011, the entire contents of each of which are hereby incorporated by reference.

The invention relates to a multistage drawing process for drawing polymeric elongated objects, containing a first drawing stage and a final drawing stage and optionally containing at least one intermediate drawing stage subsequent to the first drawing stage and prior to the final drawing stage.

Multistage drawing processes are usually employed to improve the properties, e.g. tensile strength, of polymeric elongated objects, such objects being hereinafter referred to for simplicity as elongated objects. A multistage drawing process is known for example from WO 2008/024732 wherein ultrahigh molecular weight polyethylene fibers are drawn at various phases of their existence, e.g. at least one time in a solution phase and at least three times in a solid phase. During all these phases and in particular during the solid phase of the fibers, said fibers are maximally drawn.

Another multistage drawing process applied on high molecular weight tapes is known from WO 2010/003971 wherein total drawing ratios of at least 140 are achieved. Again in all drawing stages said tapes are maximally drawn. By total drawing ratio is herein understood the product of all individual drawing ratios utilized in the individual drawing stages.

According to these state of the art publications, the processes mentioned therein enable the manufacturing of fibers or tapes having suitable tensile properties. It was however noticed that although having good productivity and enabling the manufacturing of quality fibers or tapes, these state of the art multistage drawing processes may be further optimized. Notably, it was observed that for a given draw ratio and in particular for a given total draw ratio, said multistage drawing processes can be fine-tuned to produce elongated objects having further improved properties.

An aim of the present invention may therefore be to provide an optimized multistage drawing process. In particular an aim of the present invention may be to provide a multistage drawing process, which leads at a given draw ratio, e.g. a given total draw ratio, to an elongated object having improved properties.

The invention provides a multistage drawing process comprising in the following order the steps of:
a. providing a polymeric elongated object;
b. drawing the elongated object in the first drawing stage with a draw ratio of between 30% and 90% of the maximum drawing ratio achievable in the first drawing step;
c. optionally drawing the elongated object in the at least one intermediate drawing stage with a draw ratio of between 30% and 90% of the maximum drawing ratio achievable in the at least one intermediate drawing step;
d. drawing the elongated object in the final drawing stage with a draw ratio of at most 5, preferably of at most 3.

It was observed that the multistage drawing process of the invention, hereinafter referred to for simplicity as the inventive process, may be optimized for a variety of elongated objects. In particular it was also observed that with the inventive process improved elongated objects may be made at a given draw ratio. Without being bound by any explanation, the inventors attributed the above-mentioned improvement in the properties of elongated objects to a synergy between the different drawing stages present in the inventive process. It was further observed that the inventive process may also show a good balance between efficiency, productivity and cost of the various drawing stages. In particular it was observed that breakages of elongated objects during drawing may be reduced.

In the inventive process, elongated objects are used to feed the first drawing stage. Suitable elongated objects for utilization in the inventive process may be fibers or tapes. By fiber, also referred to in the art as filament, is herein understood a body having a length much greater than its transverse dimensions. A fiber may have a regular cross-section, e.g. round, oval or circular; or an irregular cross-section, e.g. lobed, C-shaped or U-shaped. The preferred fiber used in the inventive process has a cross section having a periphery edge, wherein said fiber preferably has a ratio of its highest transverse dimension to its lowest transverse dimension of between 1 and 5, more preferably of between 1 and 3. By transverse dimension is herein understood a distance between two locations on the periphery edge of a cross section of the fiber. Yarns may also be used as elongated objects in the invention, by yarn being understood herein a body containing a plurality of fibers.

By tape is herein understood a body having a length dimension, a width dimension and a thickness dimension, wherein the length dimension of the tape is at least about the same as its width dimension but preferably greater than its width dimension, and wherein said length dimension is much greater than its thickness dimension. The tape also has a cross section having a periphery edge, said cross section being characterized by a width and a thickness. By width is herein understood the highest transverse dimension of the cross section and by thickness is herein understood the lowest transverse dimension of the cross section. The term tape also comprises the embodiments of a ribbon, a strip and a film. Suitable tape widths are between 1 mm and 2000 mm, preferably between 15 mm and 1600 mm, more preferably between 30 mm and 1600 mm. Suitable tape thicknesses are between 5 µm and 5000 µm, preferably between 10 µm and 1000 µm, more preferably between 10 µm and 500 µm and most preferably between 15 µm and 150 µm. The ratio between the width of the tape and the thickness of the tape is preferably at least 10:1, more preferably at least 25:1, most preferably at least 50:1.

The elongated object used to feed the first drawing step of the inventive process, hereinafter also referred to as the elongated feed object, may have been previously drawn or it may be in an essentially undrawn state. Preferably, the elongated feed object has a tenacity of between 0.025 GPa and 1 GPa, more preferably of between 0.05 GPa and 0.7 GPa, more preferably of between 0.075 GPa and 0.5 GPa, most preferably of between 0.1 GPa and 0.3 GPa. Preferably, the elongated feed object has also a tensile modulus of at least 0.5 GPa, more preferably of at least 1 GPa, most preferably of at least 1.5 GPa. Preferably, the elongated feed object has a tensile modulus of at most 8 GPa, more preferably of at most 5 GPa, most preferably of at most 3 GPa. Preferably, the elongated feed object has also an elongation at break of at least 5%, more preferably of at least 8%, most preferably of at least 11%. Preferably, the elongated feed object has an elongation at break of at most 30%, more preferably of at most 25%, most preferably of at most 20%.

Such elongated feed objects can be made according to processes known in the art, as for example the process of WO 2005/066401 included herein by reference. The skilled person can easily produce a series of elongated feed objects having a range of tenacities, tensile modulus and elongations at break within the desired ranges, for example by lowering or increasing in the process of WO 2005/066401 the draw ratios utilized in the various drawing stages therein and in particular the total draw ratio.

Preferably, the elongated feed object is an object comprising a polymer and a solvent for the polymer, wherein said solvent content is at most 80 wt % based on the total weight of the polymer, more preferably said solvent content is at most 50 wt %, even more preferably, said solvent content is at most 30 wt %. In one embodiment, the elongated feed object is a solid object, i.e. it has a solvent content of at most 5%, more preferably at most 3%, most preferably at most 1% based on the total weight of the polymer. In another embodiment, the elongated feed object is a gel object, i.e. it has a solvent content of between 6% and 60%, more preferably of between 20% and 55%, most preferably of between 30% and 50% based on the total weight of the polymer. In yet another embodiment, the elongated feed object is a fluid object, i.e. it has a solvent content of between 61% and 90%, more preferably of between 65% and 85%, most preferably of between 70% and 80% based on the total weight of the polymer. By solvent for the polymer is herein understood a solvent having a chi parameter of at most 0.5. Chi parameter and its measurement are well known to the person skilled in the art, and may for example be found in EP 1 137 828 B1, paragraph [0013].

Examples of polymeric elongated objects suitable for the present invention include but are not limited to elongated objects manufactured from polyamides and polyaramides, e.g. poly(p-phenyleneterephthalamide) (known as Kevlar®); poly(tetrafluoroethylene) (PTFE); poly{2,6-diimidazo-[4,5b-4',5'e]pyridinylene-1,4(2,5-dihydroxy)phenylene} (known as M5); poly(p-phenylene-2,6-benzobisoxazole) (PBO) (known as Zylon®); poly(hexamethyleneadipamide) (known as nylon 6,6), poly(4-aminobutyric acid) (known as nylon 6); polyesters, e.g. poly (ethylene terephthalate), poly(butyleneterephthalate), and poly(1,4 cyclohexylidenedimethyleneterephthalate); polyvinyl alcohols; thermotropic liquid crystal polymers (LCP) as known from e.g. U.S. Pat. No. 4,384,016; polyolefins e.g. homopolymers and copolymers of polyethylene and/or polypropylene; and combinations thereof.

Good results may be obtained when the elongated objects are polyolefin elongated objects, more preferably polyethylene elongated objects. Preferred polyethylene elongated objects are high and ultrahigh molecular weight polyethylene ([U]HMWPE) elongated objects. Polyethylene elongated objects may be manufactured by any technique known in the art, preferably by a solid-state, melt or a gel spinning process. Preferred elongated objects are gel spun UHMWPE fibers. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV) of preferably at least 5 dl/g, more preferably at least 8 dl/g, most preferably at least 10 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Gel spinning processes for manufacturing UHMWPE elongated objects and in particular UHMWPE fibers are described in numerous publications included herein by reference, e.g. EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fiber Spinning Technology*", Ed. T. Nakajima, Woodhead Publ. Ltd (1994), ISBN 185573 182 7. The elongated objects disclosed therein may be used as obtained at the various stages of said gel-spinning processes or they may be used as obtained at the final stage of said processes.

More preferably, the elongated objects used in accordance to the invention, are made by a solid-state process, i.e. a process comprising step a) compression-moulding a polymeric powder bed between pressuring means, e.g. a double belt press, at a temperature below the melting point of the polymeric powder; step b) optionally conveying the resultant compression-moulded polymeric powder between calendar rolls to form a calendared elongated object; and step c) optionally drawing the elongated object. Elongated objects made with the solid-state process are usually referred to as solid-state elongated objects. Preferably, the polymeric powder used in the manufacturing of solid-state tapes is a polyolefin powder, more preferably an UHMWPE powder. Preferably, said UHMWPE powder has an IV of preferably at least 3 dl/g, more preferably at least 4 dl/g, most preferably at least 5 dl/g. Preferably said IV is at most 40 dl/g, more preferably at most 25 dl/g, more preferably at most 15 dl/g.

In a preferred embodiment, the elongated feed object is a solid state tape, i.e. a tape obtained by compacting a polymeric powder in a press, as described for example in US 2006/0210749 included herein by reference. More preferably, the elongated feed object is a calendared solid state tape, i.e. a tape obtained by compacting a polymeric powder in a press to obtained a compacted polymeric powder and subsequently calendaring the compacted polymeric powder to obtain a calendared solid state tape as described for example also in US 2006/0210749. Drawing may also take place in the calendar, for example by using various rotation speeds for calendar's rolls. Preferably the calendared solid state tape has a tenacity of between 0.05 GPa and 1 GPa, more preferably of between 0.075 GPa and 0.5 GPa, more preferably of between 0.1 GPa and 0.3 GPa. Preferably, the calendared solid state tape has also a tensile modulus of at least 0.5 GPa, more preferably of at least 1 GPa, most preferably of at least 1.5 GPa. Preferably, the calendared solid state tape has a tensile modulus of at most 8 GPa, more preferably of at most 5 GPa, most preferably of at most 3 GPa. Preferably, the calendared solid state tape has also an elongation at break of at least 5%, more preferably of at least 8%, most preferably of at least 11%. Preferably, the calendared solid state tape has an elongation at break of at most 30%, more preferably of at most 25%, most preferably of at most 20%. It was observed that when such tapes were used as elongated feed objects, the drawing stages in the inventive process were optimized further.

In a further preferred embodiment the elongated objects used in accordance to the invention, are tapes made by a solid-state process comprising step a) compression-moulding a polymer powder bed between pressuring means, e.g. a double belt press, at a temperature below the melting point of the polymer powder; and step b) conveying the resultant compression-moulded polymer between calendar rolls to form a solid-state tape. Preferably, the polymer used in this embodiment is a polyolefin, more preferably an UHMWPE.

The invention is further explained with the help of the following Figures.

Figure 1:
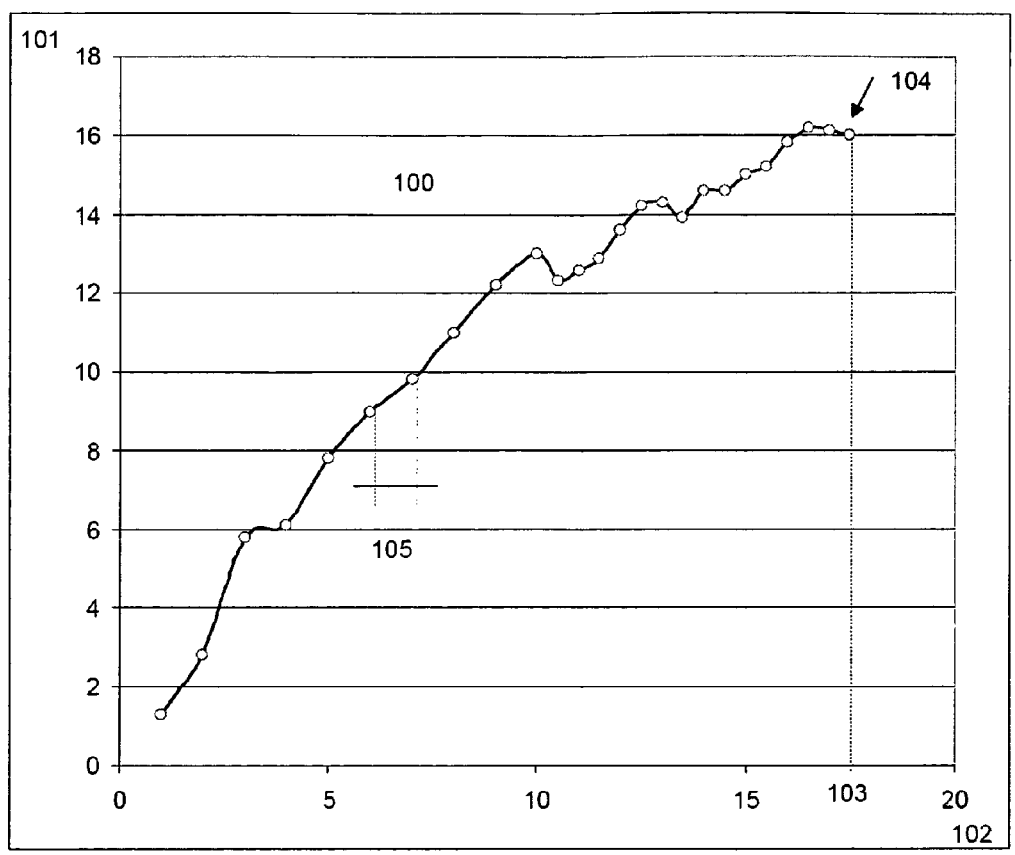
FIG. 1 shows a specific drawing curve characteristic for a drawing stage.

According to the inventive process, the elongated object is drawn in the first drawing stage with a draw ratio of between 30% and 90% of the maximum drawing ratio achievable in the first drawing stage. Preferably, the elongated object is drawn in the first drawing stage with a draw ratio of between 35% and 80%, most preferably with a draw ratio of between 40% and 75% of the maximum draw ratio.

By drawing stage is herein understood a step of the inventive process wherein an elongated object is continuously drawn, i.e. a drawing force is applied on said elongated object.

By first drawing stage is herein understood the drawing stage wherein the elongated object is firstly drawn with a draw ratio of between 30% and 90% of the maximum drawing ratio achievable in said drawing stage.

By drawing ratio is herein understood the amount of drawing imposed on the elongated object. The draw ratio (DR) as such is know to a person skilled in the art and may suitably be determined by the ratio of the outgoing speed ($V_{out}$) of an elongated object and the incoming speed ($V_{in}$) of an elongated object in a process step: $V_{out}/V_{in}$. The maximum draw ratio ($DR_{max}$) for a step may be determined by increasing the draw ratio at the set conditions (temperature and path length) of such step through either increase of $V_{out}$ and or decrease of $V_{in}$ or any combination of change of the two leading to a higher DR. At the $DR_{max}$ the elongated object will break immediately or at least within 0.25 minutes after the draw conditions have been set, typically within 0.1 minutes.

It is known in the art that the maximum drawing ratio achievable in a drawing stage depends on various conditions specific for said drawing stage, e.g. drawing speed, temperature, properties of the elongated feed objects and others. The present inventors however, noticed that a precise compilation of the above enumerated various conditions is not necessary and that the maximum drawing ratio achievable in a drawing stage may be easily and routinely determined from a so-called specific drawing curve of said drawing stage. The specific drawing curve of a drawing stage may be obtained by drawing with various draw ratios and under substantially identical drawing conditions, elongated objects having substantially identical properties and plotting the variation of a property of the elongated objects, e.g. tenacity or modulus, with the draw ratio. Elongated objects having substantially identical properties are for example elongated objects directly and repetitively obtained with the same manufacturing process. FIG. 1 shows a specific drawing curve (100) representing the tenacity (101) of the elongated objects versus the draw ratio (102) imposed thereupon. With reference to FIG. 1, the maximum draw ratio (103) achievable in a drawing stage is the draw ratio for which the elongated object breaks (104) during drawing. To account for a statistical spread in the maximum draw ratio specific to a drawing stage, a number, e.g. at least 5, of specific drawing curves for said drawing stage may be plotted and the results averaged, In order to plot said specific draw curve, a series of draw ratios may be used with an increase (105) between two subsequent draw ratios of preferably between 10% and 200%, According to the inventive process, the elongated object is drawn in the final drawing stage with a draw ratio of at most 5, preferably of at most 3. Preferably, the drawing in the final drawing stage of the elongated object having a titer (T), a maximum tenacity and a breakload (BL) is carried out with a drawing force of between 8% and 20% of the breakload (BL) of the elongated object obtained by carrying out the final drawing stage. By said breakload (BL) is understood herein the product of the titer (T) and the maximum tenacity of said elongated object. The maximum tenacity of the elongated object obtained by carrying out the final drawing stage can be readily determined from a so-called specific tenacity curve. Similar with the methodology used to plot the graph represented in FIG. 1, the specific tenacity curve of the final drawing stage may be obtained by drawing in the final drawing stage with various draw ratios and under substantially identical drawing conditions, elongated objects having substantially identical properties and plotting the tenacity of the elongated objects versus the draw ratio. The maximum of the specific tenacity curve is considered as the maximum tenacity obtainable in the final drawing stage.

The inventive process may also comprise at least one intermediate drawing stage subsequent to the first drawing stage and prior to the final drawing stage. During the at least one intermediate drawing stage, the elongated object is preferably drawn with a draw ratio of between 30% and 90% of the maximum drawing ratio achievable in the at least one intermediate drawing step. The maximum draw ratio achievable in the at least one intermediate drawing stage can be determined, as detailed hereinbefore, from the specific drawing curve of the at least one intermediate drawing step.

The drawing stages may use any conventional drawing hardware designed for drawing elongated objects. For example, drawing ovens, e.g. forced gas convection drawing ovens, liquid ovens, hot shoe and hot pin ovens may be used in the inventive process. Preferred ovens however are gas ovens. The ovens may be provided with rotating drawing rolls, if needed equipped with niprolls to reduce slippage of the elongated object over the roller surface, said rotating drawing rolls being preferably used to impart an in situ draw ratio to the elongated objects. A draw ratio may be routinely imparted to an elongated object by setting a different surface speed to the drawing rolls.

Every drawing stage usually comprises at least an inlet device providing the elongated object to e.g. the drawing oven. The inlet device is often used to determine a certain inlet speed and is preferably capable of holding a substantially constant drawing force on the elongated object. The drawing stage may also contain an outlet device receiving the elongated object from the e.g. drawing oven and having an outlet speed. The outlet device may also be capable of holding a drawing force on the elongated object. Optionally, for better results, the inlet and/or the outlet device may be heated.

Although not mandatory, the elongated objects may also be stored between the various drawing stages of the inventive process.

The invention also relates to an elongated object obtainable with the inventive process. In particular, the invention also relates to an elongated object preferably an UHMWPE elongated object, said object being preferably a fiber, a tape or a solid state tape, having:

I. a tensile strength of between 1.5 GPa and 3 GPa, preferably of between 1.8 GPa and 2.7 GPa, more preferably of between 2 GPa and 2.5 GPa;

II. a tensile modulus of between 80 GPa and 200 GPa, more preferably of between 100 GPa and 170 GPa, most preferably of between 120 GPa and 150 GPa; and III. an elongation at break of at most 2.5%, preferably of at most 2%, more preferably of at most 1.8%.

It was observed that the elongated objects of the invention proved very useful in many applications, e.g. ballistics, panels, sheets, fabrics, radomes, reinforcing elements, etc. The invention therefore also relates to such applications containing the elongated objects of the invention.

The following METHODS OF MEASUREMENT were used in the present invention.

Intrinsic Viscosity (IV) for polyethylene is determined according to method PTC-179 (Hercules Inc. Rev. Apr. 29, 1982), or alternatively ASTM D-1601, at 135° C. in decalin, the dissolution time being 16 hours, with DBPC as anti-oxidant in an amount of 2 g/l solution, by extrapolating the viscosity as measured at different concentrations to zero concentration.

Side chains in a polyethylene or UHMWPE sample is determined by FTIR on a 2 mm thick compression molded film by quantifying the absorption at 1375 $cm^{-1}$ using a calibration curve based on NMR measurements (as in e.g. EP 0 269 151)

Tensile properties, e.g. tenacity, modulus and elongation at break, of elongated objects were determined in accordance with ASTM D885M.

Tensile properties of polymeric fibers were determined at room temperature (about 22° C.) on multifilament yarns as specified in ASTM D885M, using a nominal gauge length of the fiber of 500 mm, a crosshead speed of 50% min and Instron 2714 clamps, of type Fiber Grip D5618C. For calculation of the tenacity, the tensile forces measured are divided by the titer, as determined by weighing 10 meters of fiber; values in GPa for are calculated assuming the natural density of the polymer, e.g. for UHMWPE is 0.97 $gcm^3$.

The tensile properties of tapes and films are defined and determined as specified in ASTM D882 at about 22° C., on tapes (if applicable obtained from films by slitting the films with a knife) of a width of 2 mm, using a nominal gauge length of the tape of 440 mm and a crosshead speed of 50 mm/min. If the tapes were obtained from slitting films, the properties of the tapes were considered to be the same as the properties of the films from which the tapes were obtained.

The melting temperature (also referred to as melting point) of a polymeric powder is measured according to ASTM D3418-97 by DSC with a heating rate of 20° C. min, falling in the melting range and showing the highest melting rate.

The melting temperature (also referred to as melting point) of an elongated object is determined by DSC on a power-compensation PerkinElmer DSC-7 instrument which is calibrated with indium and tin with a heating rate of 10° C. min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The invention will be further explained hereinafter with the help of the following examples and comparative experiments without however being limited thereto.

Production of a Feed Elongated Object in the Form of a Tape

An UHMWPE powder, which is processable in the solid state, having an IV of about 10 dl/g, an average particle size of 275 μm and a bulk density of about 0.25 $g/cm^3$, was formed into a powder bed of thickness of about 1.0 mm. The powder bed was subjected to compaction in a double belt press. The powder bed was heated to a temperature of 135° C. and pressed at a pressure of 35 bar during 1 minute.

The compacted powder was subsequently calendared at a temperature of 140° C. to form a precursor tape.

The precursor tape as produced had a tenacity of about 0.13 GPa, a modulus of about 0.19 GPa, an elongation at break of about 12.5% and a titer of about 10067 dtex.

EXAMPLE 1

The specific drawing curve for the precursor tape was determined by using a series of drawing ratios to draw the precursor tape. The series of drawing ratios started with a draw ratio of 2 and increased incrementally with 25%. The maximum drawing ratio specific for the precursor tape was 17.5. Attempting to apply a higher drawing ratio, the tape broke during drawing.

The precursor tape was drawn in a first stage at a temperature of about 145° C. to a draw ratio of 85% of the maximum draw ratio, i.e. to a draw ratio of 15. Said tape was subsequently drawn in a second drawing stage with a draw ratio of 1.8, yielding a total draw ratio applied on the precursor tape of 15×1.8=27.

The tenacity obtained for the drawn tape of this experiment was 1.84 GPa, its modulus was 129.1 GPa and its elongation at break was 1.7%.

EXAMPLE 2

Example 1 was repeated with the difference that the precursor tape was drawn in a first stage at a temperature of about 145° C. to a draw ratio of 74% of the maximum draw ratio, i.e. to a draw ratio of 13. Said tape was subsequently drawn in a second drawing stage with a draw ratio of 2, yielding a total draw ratio applied on the precursor tape of 13×2=26.

The tenacity obtained for the drawn tape of this experiment was 2.01 GPa, its modulus was 126.2 GPa and its elongation at break was 2%.

COMPARATIVE EXPERIMENT A

Example 1 was repeated with the difference that the precursor tape was drawn in a first stage at a temperature of about 145° C. to a draw ratio of 97% of the maximum draw ratio, i.e. to a draw ratio of 17. Said tape was subsequently drawn in a second drawing stage with a draw ratio of 1.2, yielding a total draw ratio applied on the precursor tape of 17×1.2=20.4. No higher draw ratio was possible in the second drawing step.

The tenacity obtained for the drawn tape of this experiment was 1.58 GPa, its modulus was 94 GPa and its elongation at break was 1.8%.

COMPARATIVE EXPERIMENT B

Example 1 was repeated with the difference that the precursor tape was drawn in a first stage at a temperature of about 145° C. to a draw ratio of 23% of the maximum draw ratio, i.e. to a draw ratio of 4. Said tape was subsequently drawn in a second drawing stage with a draw ratio of 5.5, yielding a total draw ratio applied on the precursor tape of 5.5×4=22. No higher draw ratio was possible in the second drawing step.

The tenacity obtained for the drawn tape of this experiment was 1.11 GPa, its modulus was 64.2 GPa and its elongation at break was 1.8%.

Figure 2:
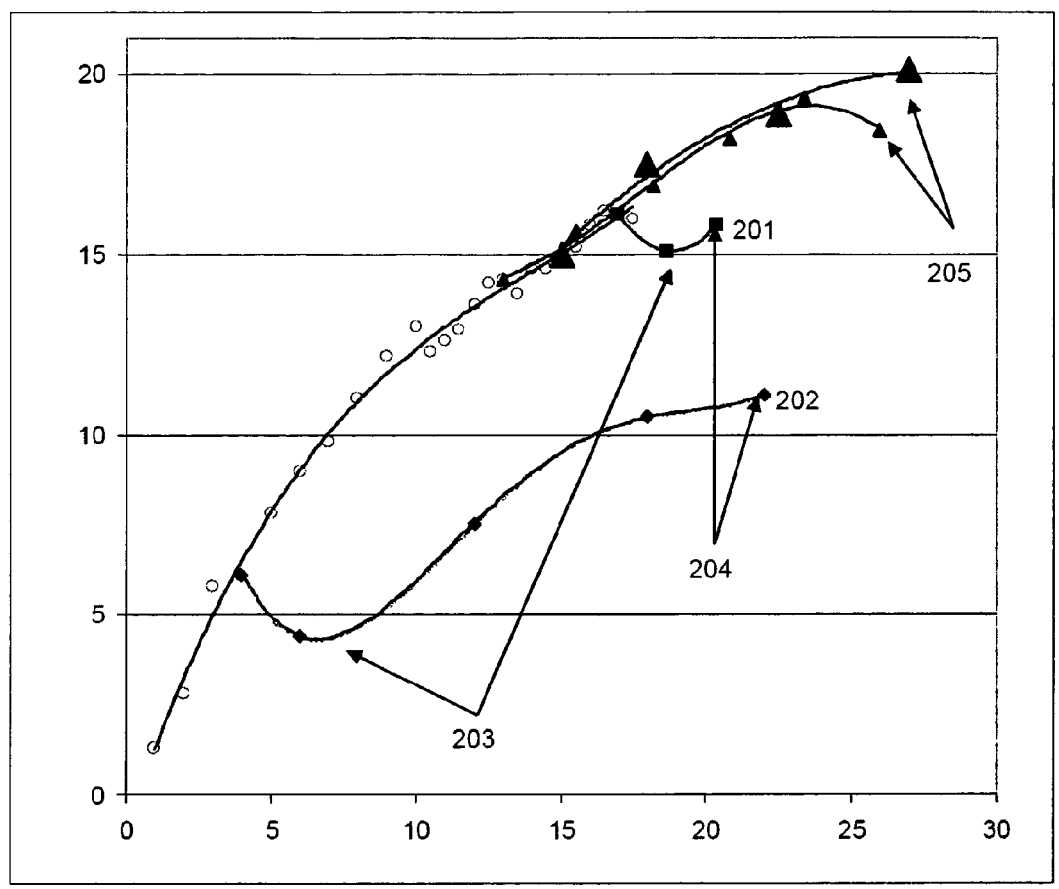
FIG. 2 shows the influence of the drawing process on the final properties of the tapes.

The results obtained in the Examples and Comparative Experiments presented hereinabove are also plotted in FIG. 2. FIG. 2 shows, as FIG. 1, tenacity of the elongated objects versus the draw ratio. From FIG. 2 it can be seen that for the drawing processes characteristic to the Comparative Experiments (201) and (202), a reduction (203) in the properties of the tape was achieved while drawing said tape. Moreover, the tapes of the Comparative Experiments had significantly lower properties (204) than the tapes obtained with the processes of the Examples (205).

The invention claimed is:

1. A multistage drawing process for drawing polymeric elongated objects, containing a first drawing stage and a final drawing stage and optionally containing at least one intermediate drawing stage subsequent to the first drawing stage and prior to the final drawing stage, the process comprising in the following order the steps of:
   (a) providing a polymeric elongated feed object having a tenacity of between 0.025 GPa and 1 GPa;
   (b) drawing the elongated object in the first drawing stage with a draw ratio of between 30% and 90% of the maximum drawing ratio achievable in the first drawing step;
   (c) optionally drawing the elongated object in the at least one intermediate drawing stage with a draw ratio of between 30% and 90% of the maximum drawing ratio achievable in the at least one intermediate drawing step;
   (d) drawing the elongated object in the final drawing stage with a draw ratio of at most 5 to yield a polymeric elongated object having a tenacity greater than 1.5 GPa.

2. The process of claim 1, wherein the polymeric elongated object is a fiber.

3. The process of claim 2, wherein the fiber has a length and transverse dimensions, and wherein a ratio of a highest transverse dimension of the fiber to a lowest transverse dimension of the fiber is between 1 and 5.

4. The process of claim 1, wherein the elongated object is a tape.

5. The process of claim 4, wherein the tape has a width of between 2 mm and 2000 mm.

6. The process of claim 1, wherein the elongated object is a solid object having a polymer solvent content of at most 5 wt % based on the total weight of the polymer.

7. The process of claim 1, wherein the elongated feed object is a calendared solid state tape.

8. The process of claim 1, wherein the elongated object is a polyolefin elongated object.

9. The process of claim 1, wherein the elongated object is a high or ultrahigh molecular weight polyethylene elongated object.

10. The process of claim 1, wherein the elongated feed object is drawn in the first drawing stage with a draw ratio of between 35% and 80%.

11. The process of claim 1, wherein the drawing in the final drawing stage of the elongated object having a titer (T) and a breakload (BL) is carried out with a drawing force of between 8% and 20% of the breakload (BL) of the elongated object obtained by carrying out the final drawing stage.

12. The process of claim 1, wherein step (d) is practiced by drawing the elongated object in the final drawing stage with a draw ratio of at most 3.

13. The process of claim 3, wherein the ratio of the highest transverse dimension to the lowest transverse dimension of the fiber is between 1 and 3.

14. The process of claim 1, wherein the elongated objected obtained in step (d) has a tensile strength between 1.5 GPa and 3 GPa, a tensile modulus between 80 and 200 GPa, and an elongation at break of at most 2.5%.

* * * * *